US006817314B1

(12) United States Patent
Conte

(10) Patent No.: US 6,817,314 B1
(45) Date of Patent: Nov. 16, 2004

(54) FREE STANDING SUPPORT FOR POSITIONAL BOTTLE FEEDER

(76) Inventor: JoAnne Conte, 4056 Massachusetts Ave., Island Park, NY (US) 11558

( * ) Notice: Subject to any disclaimer, the term of this patent is extended or adjusted under 35 U.S.C. 154(b) by 0 days.

(21) Appl. No.: 10/726,840

(22) Filed: Dec. 4, 2003

Related U.S. Application Data

(60) Provisional application No. 60/431,746, filed on Dec. 9, 2002.

(51) Int. Cl.[7] .................................................. A01K 7/00
(52) U.S. Cl. ...................... 119/72.5; 248/107; 248/146; 119/72
(58) Field of Search ................................ 119/61.57, 72, 119/72.5, 454, 464, 475, 478; 211/85.13; 248/105, 107, 132, 146, 176.1

(56) References Cited

U.S. PATENT DOCUMENTS

| | | | | |
|---|---|---|---|---|
| 625,271 A | * | 5/1899 | Lang | 211/85.13 |
| 1,855,314 A | * | 4/1932 | Schacht | 119/51.5 |
| 2,654,556 A | * | 10/1953 | Lathrop | 248/105 |
| 4,173,948 A | * | 11/1979 | Austin | 119/72 |
| 5,090,587 A | * | 2/1992 | Brown | 220/475 |

* cited by examiner

Primary Examiner—Robert P. Swiatek
(74) Attorney, Agent, or Firm—Myron Amer, P.C.

(57) ABSTRACT

A water bottle feeder for pet dogs operated by contact thereagainst of the pet, the bottle being supported on a stand that uses the water in the bottle as ballast to counteract any tipping as may be caused by the pet contact, and supports the bottle at selected heights to facilitate feeding to dogs in all popular domesticated species classifications.

1 Claim, 2 Drawing Sheets

FREE STANDING SUPPORT FOR POSITIONAL BOTTLE FEEDER

CROSS REFERENCE TO RELATED APPLICATIONS

This application claims the benefit of U.S. Provisional Patent Application No. 60/431,746, filed on Dec. 9, 2002, the contents of which are incorporated herein by reference thereto.

The present invention relates generally to improvements in the water-feeding of pets, particularly dogs, and particularly in attending to this chore in other than the owner's home.

EXAMPLE OF THE PRIOR ART

It is already known, as illustrated and described in U.S. Pat. No. 3,589,338 for "HOLDER FOR TUBE AND BOTTLE FEEDERS FOR PETS" issued to Lovitz on Jun. 29, 1971, that dogs are smart enough to be trained to operate a bottle feeder by exerting their body weight to open a value releasing water to the end purpose of being consumed by the dog, but the stability for the bottle feeder is provided by it being confined to a wall of a cage, thus lacking a portability to any location not having a cage, which typically is a location away from the home of the pet owner.

Thus, although not as desirable, an alternative is to feed pet dogs using an open water-filled dish even though it is subject to splashing and often unsanitary conditions due to its exposure.

Broadly, it is an object of the present invention to overcome the foregoing and other shortcomings of the prior art.

More particularly, it is an object to use a free standing support stand for a bottle feeder and use to advantage the weight of the water in the bottle until totally consumed to serve as ballast, which in cooperation with a base, contributes adequate stability to maintain a vertical orientation of the support or stand, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
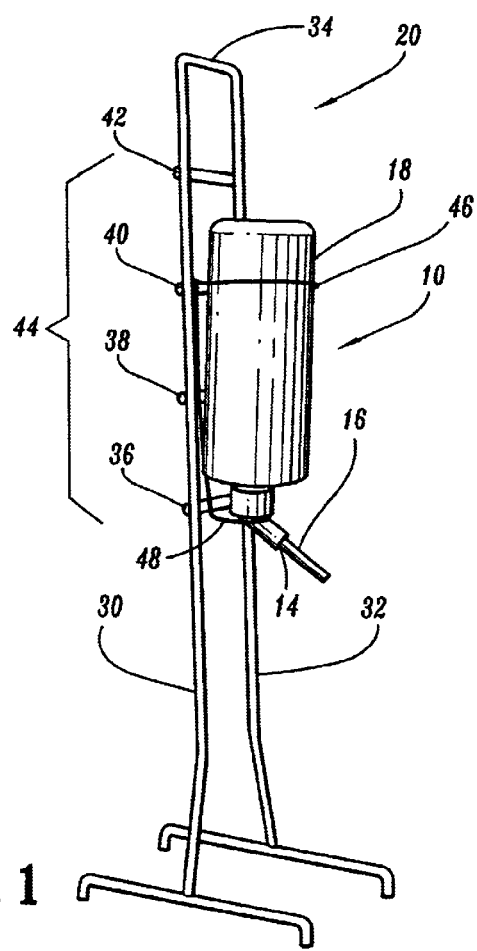
Figure 2:
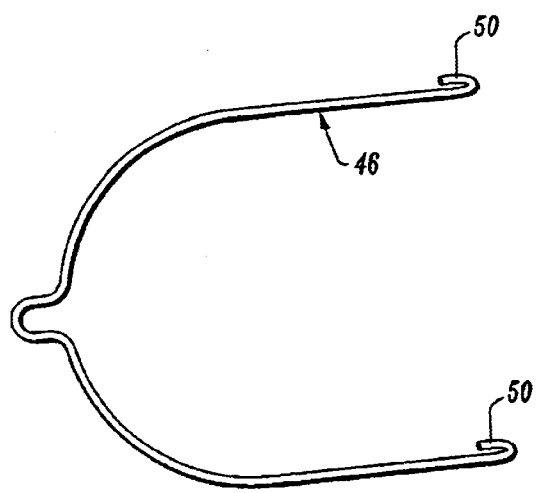
Figure 3:
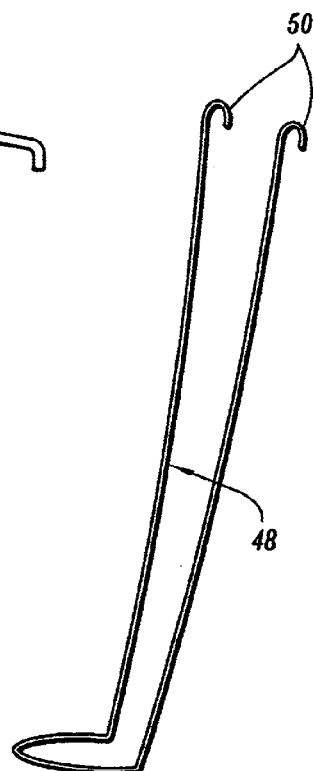
Figure 4:
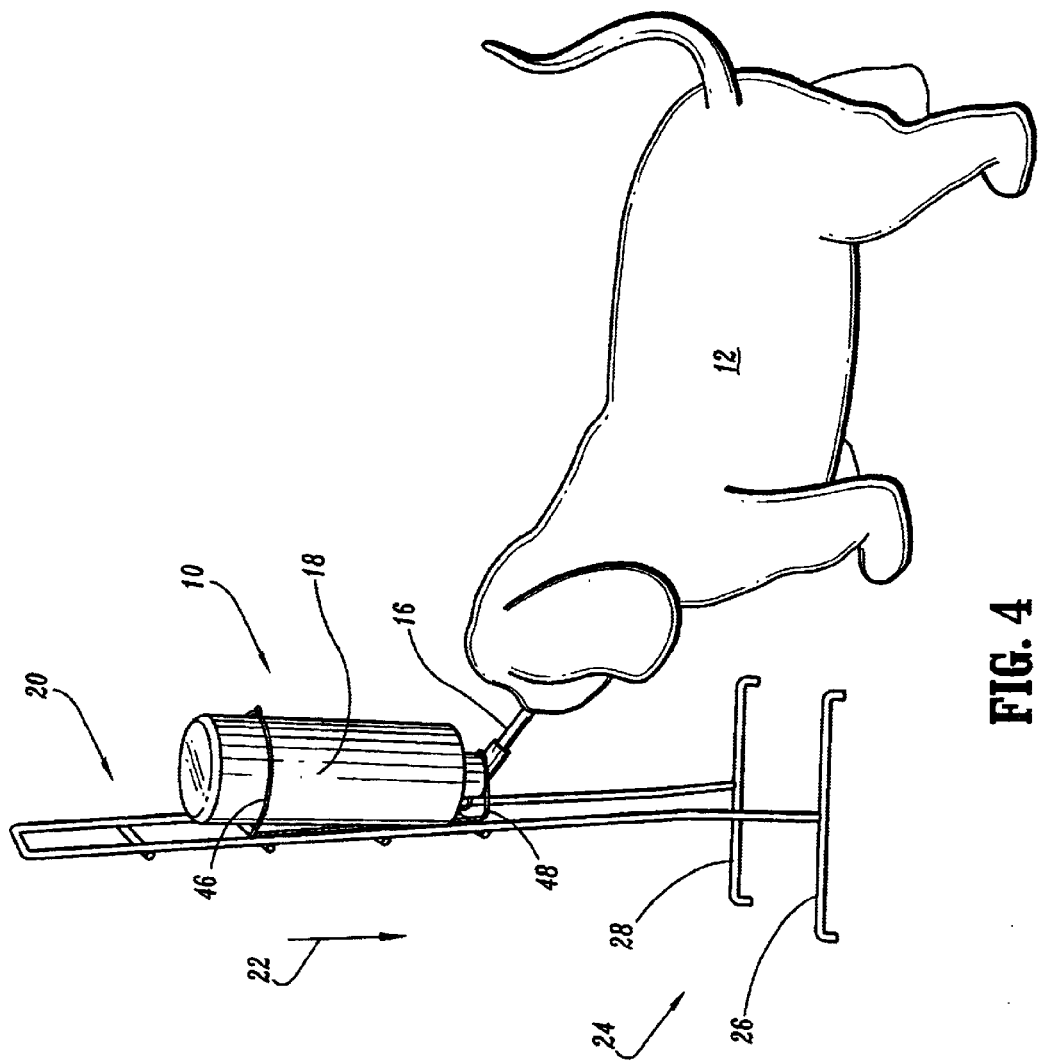

FIG. 1 is an isolated view of a pet bottle feeder on a free standing support according to the present invention;

FIGS. 2 and 3 respectively illustrate upper and lower wire clips for attaching a pet bottle feeder at a selected operative position on the support of FIG. 1;

FIG. 4, like FIG. 1, is similarly a perspective view but illustrating a feeding use of the supported bottle feeder.

Bottle feeders, exemplified by the illustrated embodiment generally designated 10, are in popular use since a pet 12 can be readily trained to push in against a ball valve 14 and release by gravity flow along an angularly oriented tube 16 drinking water from a bottle container 18, thus obviating the less desirable option of using an open water-filled dish subject to splashing and often unsanitary conditions due to its exposure. The tradeoff, however, is that the water-filled dish is appropriate for all sizes of pets whereas the supported FIGS. 1 and 4 bottle feeder must have its position thereon correlated to the height of the feeding pet. Underlying the present invention is the recognition that this correlation is readily achieved in the use of a free standing support, generally designated 20, because the weight of the water in the bottle until totally consumed serves as ballast, as noted by the arrow 22, and in cooperation with a base, generally designated 24, the noted conditions 22, 24 add adequate stability to maintain a vertical orientation of the support or stand 20. Heretofore, as illustrated and described in U.S. Pat. No. 3,589,338 for "Holder For Tube and Bottle Feeders For Pets" issued to Lovitz on Jun. 29, 1971, stability for a bottle feeder was confined to a wall of a cage, thus lacking the portability of the within free standing support 20, and also lacking any size accommodation or correlation to different sizes of pet species, as will be better understood from the description which follows.

Base 24 is constructed of two feet 26 and 28 of wire construction material, oriented transversely of the vertical plane of the stand 20. Stand 20 consists of two vertical wire extensions 30 and 32 of the base 24 with a closed end 34 delimiting, in a preferred embodiment, a height of approximately 21 inches. Starting at a height above the base 24 of approximately 12 inches are successive rungs, consisting of a bottom or first rung 36, second rung 38, third rung 40, and fourth rung 42, each welded at opposite ends to the verticals 30 and 32, and uniformly set at height increments of approximately 3¼ inches, individually and collectively designated 44. Upper (FIG. 2) and lower (FIG. 3) clips 46 and 48 are disposed in encircling relation about the bottle container 18 and hooks 50 thereon are engaged to a cooperating rung. The clip 48 is shaped to fit beneath, and thus provide support from below, to the bottom end of the bottle container 18.

In field testing it has been determined that the bottle 10 supported adjacent the first and second rungs 36 and 38 is at an appropriate height of 13 inches for the water feeding of puppies and shihtzu and like-sized species, adjacent the second and third rungs 38 and 40 at an approximate height of 15¾ inches for the water feeding of cocker spaniel and like-sized species, and adjacent the third and fourth rungs 40 and 42 at an approximate height of 19 inches for the water feeding of German Shepherd, Labrador Retriever and like-sized species.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination, a water bottle feeder for pets and for its support a free standing frame:
   A. said water bottle feeder comprising:
      (1) a bottle of plastic construction material of cylindrical shape bounding a correspondingly cylindrical water-storage compartment;
      (2) said storage compartment having a bottom closure with edges having threads thereabaout bounding an exit opening therefrom;
      (3) a cap threadably engaged to said threaded edges of said bottom exit opening;
      (4) a tube oriented at an angle integral to said cap for directing gravity flow of stored water in said bottle storage compartment to a free end of said tube; and
      (5) a movable ball in said tube free end for selectively releasing water from said tube for pet consumption in response to said ball being depressed in movement inwardly of said tube by a pet; and B. said free standing frame comprising:
  (1) an upstanding body of wire construction material having two substantially parallel spaced apart vertically oriented left and right members;
  (2) at least four members horizontally oriented spaced apart transversely of said left and right members at approximately a first height of 13 inches, at approximately a second height of 15¾ inches, and at approximately a third height of 19 inches; and
  (3) clip means for selectively attaching said bottle in a vertical orientation at said approximate first height of 13 inches preparatory to feed pet dogs in the classification of puppies and shihtzu species, at said approximate second height of 15¾ inches preparatory to feed pet dogs in the classification of Cocker Spaniel species, and at said approximate third height of 19 inches preparatory to feed pet dogs in the classification of German Shepherd and Labrador Retriever species;

whereby said water bottle feeder in combined use on said frame support is adaptable to feed pet dogs in all popular domesticated classifications.

* * * * *